(12) United States Patent
Kim (10) Patent No.: US 6,327,141 B2
(45) Date of Patent: *Dec. 4, 2001

(54) PORTABLE COMPUTER FOR INFRARED DATA COMMUNICATION

(75) Inventor: Jao-Wook Kim, Kyunggi-do (KR)

(73) Assignee: SamSung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,561

(22) Filed: Oct. 16, 1998

(30) Foreign Application Priority Data

Oct. 17, 1997 (KR) ................................ 97-53475

(51) Int. Cl.$^7$ ........................................ G06F 1/16
(52) U.S. Cl. .................. 361/681; 361/679; 361/681; 361/683; 345/156; 345/158; 359/109; 359/152; 359/154; 359/180; 359/189; 235/375; 235/441; 235/486; 235/487
(58) Field of Search ................... 359/109, 152, 359/154, 180, 189; 345/158, 156; 235/487, 486, 492, 375, 441; 361/679, 681, 683

(56) References Cited

U.S. PATENT DOCUMENTS

| | | | |
|---|---|---|---|
| 4,727,600 | * | 2/1988 | Avakian ................ 455/601 |
| 5,416,627 | * | 5/1995 | Wilmoth ................ 359/159 |
| 5,736,527 | * | 4/1998 | Nakada et al. ............ 235/487 |
| 5,736,727 | * | 4/1998 | Nakata et al. ............ 235/487 |
| 5,781,177 | * | 7/1998 | Helot et al. ............. 345/156 |
| 5,781,405 | | 7/1998 | Vollser . |
| 5,808,769 | * | 9/1998 | Kerklaan et al. .......... 359/180 |
| 5,812,371 | | 9/1998 | Chen et al. . |

* cited by examiner

Primary Examiner—Leo P. Picard
Assistant Examiner—Yean-Hsi Chang
(74) Attorney, Agent, or Firm—Robert E. Bushnell, Esq.

(57) ABSTRACT

A portable computer with infrared data communication capabilities is disclosed. The computer has an infrared transceiver capable of enlarging the data sending/receiving angle and reliably performing radio data communication with another electronic appliance. The computer also has a selection circuit capable of activating all light elements during a data sending operation or selecting one active light receiving element from a plurality of light receiving elements during a data receiving operation, thus performing a reliable infrared data communication. In the computer, an opening is formed on an outside edge of the display body. Both an infrared data sending unit, consisting of at least one light element, and an infrared data receiving unit, consisting of at least one light receiving element, are commonly carried on a circuit board set in the opening of the display body.

12 Claims, 5 Drawing Sheets

PORTABLE COMPUTER FOR INFRARED DATA COMMUNICATION

CLAIM OF PRIORITY

This application makes reference to, incorporates the same herein, and claims all benefits accruing under 35 U.S.C. §119 from an application entitled Portable Computer For Infrared Data Communication earlier filed in the Korean Industrial Property Office on the 17$^{th}$ day of Oct. 1997, and there duly assigned Ser. No. 97-53475, a copy of which is annexed hereto.

BACKGROUND OF THE INVENTION

1. Technical Field

The present invention relates to a portable computer with infrared data communication capabilities, and more particularly to a portable computer provided with an infrared transceiver capable of reliably performing radio data communication with other electronic devices.

2. Related Art

As well known to those skilled in the art, several techniques have been developed and proposed to allow users to more effectively use electronic devices. Particularly, developments in radio communication techniques allow a variety of electronic devices to perform radio data communication with other electronic devices, thus allowing such radio communication to be generalized in daily life.

Due to such improved and generalized radio communication techniques, computers perform data communication with each other, their accessories or portable data terminals. Such radio communication is advantageous in that it somewhat effectively eliminates known problems experienced in communication through wire.

Computer systems are information handling systems that are utilized by many individuals and businesses today. A computer system can be defined as a microcomputer that includes a central processing unit (CPU), a volatile memory, a non-volatile memory, a display monitor, a keyboard, a mouse or other input device such as a trackball, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together. Portable computers are often referred to as laptop, notebook, or subnotebook computers.

An example of such radio communication techniques used with computers is an infrared transceiver capable of allowing computers to perform radio data communication according to the provisions of Infrared Developers Association (IrDA). The Infrared Developers Association (IrDA) is a group of representatives from computer-related companies. The Infrared Developers Association was formed to develop a standard set of specifications enabling a computer system to utilize infrared signals in lieu of cables in order to communicate with other computer systems and also with peripherals such as printers. On Jun. 30, 1994 the IrDA approved the original specification known as IrDA Version 1.0. Since that time, additional specifications have been approved.

In order to perform such radio data communication according to the provisions of IrDA, the data sending/receiving module of such a transceiver, connected to related circuits of computers, has to be exteriorly installed on the computers. The infrared rays, used in the data communication according to the provisions of IrDA, is radiated linearly due to their characteristics. The radio data communication between two electronic appliances, having such infrared transceivers, is thus exclusively performed when the data sending/receiving modules of the two appliances have to be positioned opposite to each other. In order to perform an effective radio data communication between electronic appliances using such infrared transceivers, it is necessary to limit the distance between the data sending/receiving modules of the appliances within a short distance. It is also necessary to position the data sending/receiving module of one appliance within an angular region inclined from the data sending/receiving module of another appliance at an angle of about 15 degrees upwardly, downwardly, leftwardly or rightwardly.

The data sending/receiving module of such an infrared transceiver is typically positioned on the rear or side wall of an electronic appliance in a vertical direction. Therefore, when an electronic appliance, having such a vertically positioned data sending/receiving module, is used for performing infrared data communication with another appliance having the same type of transceiver, the infrared data communication between the two data sending/receiving modules is free from any trouble caused by an angular position of the two appliances. However, when the modules of the infrared transceivers are placed on positions remarkably diverged from reference positions to the left or right, it is almost impossible to match the data sending/receiving modules of electronic appliances within an effective data communication region. Therefore, the known infrared transceivers are not effectively used with electronic appliances used in offices where it is almost impossible to match the direction of the data sending/receiving modules of the appliances or limit the distance between the modules.

Particularly, due to the above problems experienced in known infrared transceivers, it is very difficult to match the direction of the data sending/receiving modules of electronic appliances or set the distance between the modules in the case of desktop or portable computers. Such portable computers are widely used in recent days in place of desktop computers due to their portability and are classified into laptop computers, notebook computers and palmtop computers. Such desktop or portable computers, provided with infrared transceivers, are typically used while being laid on conference tables or desks. Therefore, when it is necessary to send or receive data between a main computer and a plurality of desktop or portable computers, the desktop or portable computers, laid on tables or desks arranged along several rows, may fail to effectively perform infrared data communication with the main computer.

Exemplars of recent efforts in the art include U.S. Pat. No. 5,812,371 for an Orientation-adjustable Infrared Transceiver Used in a Notebook Type Computer issued to Chen et al., U.S. Pat. No. 5,808,769 for a Combination Diffused and Directed Infrared Transceiver issued to Kerklaan et al., U.S. Pat. No. 5,781,405 for an Electronic Device Having a Rotatably Mounted Infrared Device with a Pair of Pegs Fitting into a Pair of Holes issued to Vossler, and U.S. Pat. No. 5,781,177 for a Combined High-speed and Low-speed Infrared Transceiver on Computer Display Panel Housing issued to Helot et al.

While these recent efforts provide advantages, I note that they fail to adequately address bow a portable computer can be provided with an infrared transceiver capable of efficiently and reliably performing radio data communication with other electronic devices.

SUMMARY OF THE INVENTION

Accordingly, the present invention has been made keeping in mind the above problems occurring in the prior art, and an object of the present invention is to provide a portable computer, which is provided with an infrared transceiver capable of enlarging the data sending/receiving angle and reliably performing radio data communication with another electronic appliance.

Another object of the present invention is to provide a portable computer, which is provided with a selection circuit capable of activating all light elements during a data sending operation of the computer or selecting one active light receiving element from a plurality of light receiving elements during a data receiving operation of the computer, thus performing a reliable infrared data communication.

In order to accomplish the above object, the present invention provides a portable computer for infrared data communication, comprising: a main body having a main board; a display body hinged to an edge of the main body and having a display panel, the display panel being opposed to a top surface of the main body when the main body is covered with the display body; an opening having a predetermined size and configuration and formed on an outside edge of the display body; at least one circuit board set in the opening and electrically connected to the main board; an infrared data sending unit comprising at least one light element, the data sending unit being carried on the circuit board to be directed toward the opening when the circuit board is set in the opening; an infrared data receiving unit comprising at least one light receiving element, the data receiving unit being carried on the circuit board to be directed toward the opening when the circuit board is set in the opening; and a transparent window set on the opening, thus closing the opening while allowing light to pass through.

To achieve these and other objects in accordance with the principles of the present invention, as embodied and broadly described, the present invention provides a computer apparatus with infrared data communication capabilities, comprising: a main body of a computer apparatus, said main body forming an aperture of a predetermined size on an outer edge of said main body; a first circuit board being installed in said main body; a second circuit board being installed in the aperture and being electrically coupled to said first circuit board; an infrared data sending unit including a plurality of light sending elements, said data sending unit being installed on said second circuit board and being oriented to be directed toward the aperture when said second circuit board is mounted in the aperture; an infrared data receiving unit including a plurality of light receiving elements, said data receiving unit being installed on said second circuit board and being oriented to be directed toward the aperture when said second circuit board is mounted in the aperture; and a window unit being mounted at the aperture and enclosing the aperture, said window unit allowing infrared light to pass through said window unit.

To achieve these and other objects in accordance with the principles of the present invention, as embodied and broadly described, the present invention provides a computer apparatus with infrared data communication capabilities, comprising: a main body of a computer apparatus; a first circuit board being installed in said main body; a video display conveying varying visual information to a user, said video display forming an aperture of a predetermined size on an outer edge of said video display, said video display being coupled to said main body; a second circuit board being installed in the aperture and being electrically coupled to said first circuit board; an infrared data sending unit including a plurality of light sending elements, said data sending unit being installed on said second circuit board and being oriented to be directed toward the aperture when said second circuit board is mounted in the aperture; an infrared data receiving unit including a plurality of light receiving elements, said data receiving unit being installed on said second circuit board and being oriented to be directed toward the aperture when said second circuit board is mounted in the aperture; and a window unit being mounted at the aperture and enclosing the aperture, said window unit allowing infrared light to pass through said window unit.

To achieve these and other objects in accordance with the principles of the present invention, as embodied and broadly described, the present invention provides a computer apparatus with infrared data communication capabilities, comprising: a main body of a computer apparatus, said main body forming an aperture of a predetermined size on an outer edge of said main body; a first circuit board being installed in said main body; a second circuit board being installed in the aperture and being electrically coupled to said first circuit board; and an infrared data transceiver unit including a plurality of light sending elements and a plurality of light receiving elements, said infrared data transceiver unit being installed on said second circuit board and being oriented to be directed toward the aperture when said second circuit board is mounted in the aperture.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
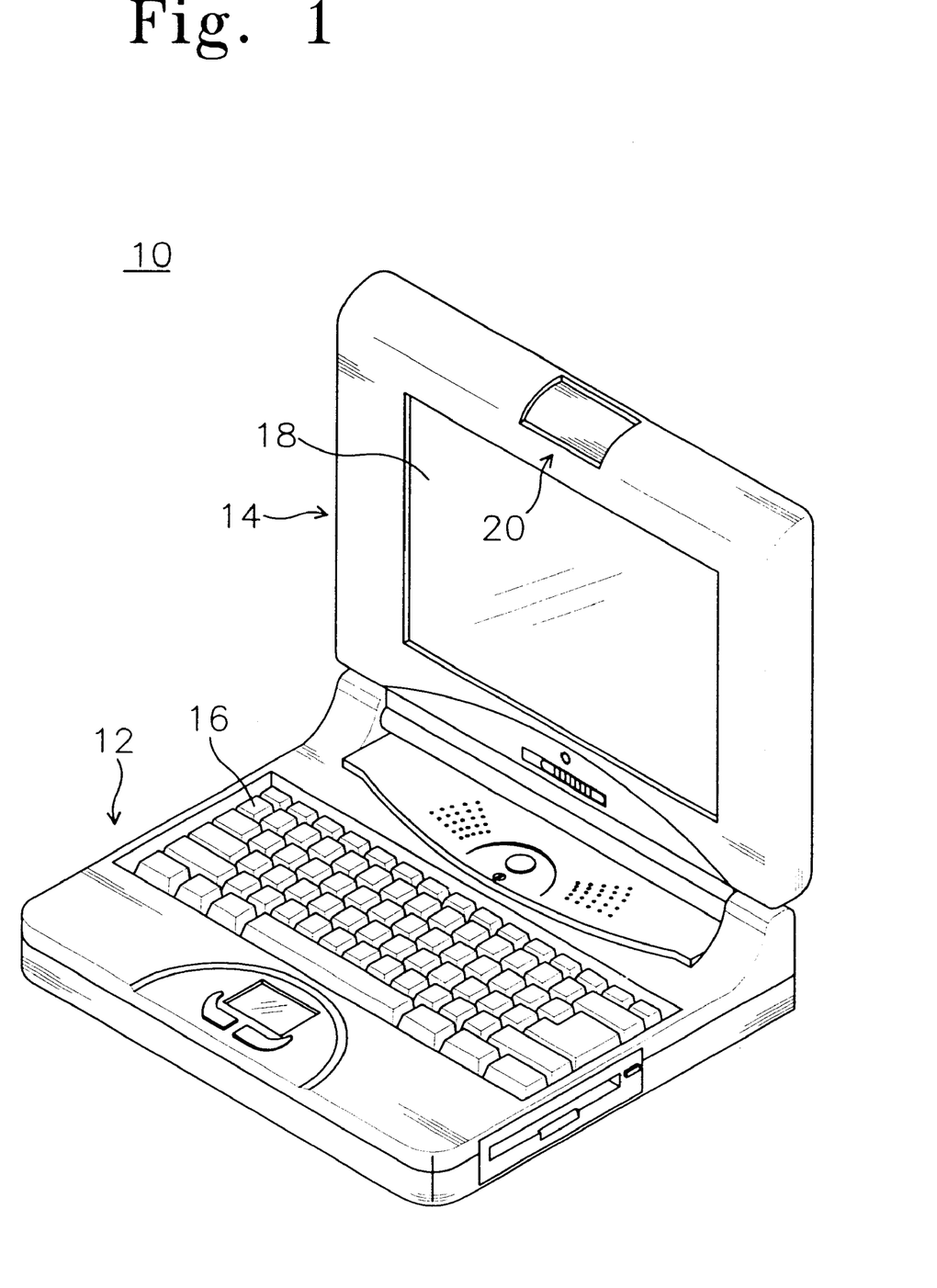
FIG. 1 is a perspective view of a portable computer with infrared data communication capabilities, in accordance with the principles of the preferred embodiment of the present invention.

Turn now to FIG. 1, which is a perspective view of a portable computer with infrared data communication capabilities, in accordance with the principles of the preferred embodiment of the present invention. As shown in FIG. 1, the portable computer 10 for infrared data communication of this invention comprises two parts: a main body 12 and a display body 14. A data input keyboard 16 is provided on the top surface of the main body 10, while a main board (not shown) is installed in the body 10. The main board is provided with a circuit performing infrared data communication. The display body 14 is hinged to the rear edge of the main body 12 with a display panel 18 of the body 14 being opposed to the keyboard 16 of the main body 12 when the main body 12 is covered with the display body 14. When the display body 14 is opened at an angle, it displays the data operating process on its display panel 18. The above display body 14 is also used as a cover for the main body 12. That is, when the display body 14 is closed on the main body 12, the display body 14 safely covers the main body 12.

An infrared transceiver 20 is set on the display body 14 at a position, for example, the outside edge of the body 14. The above infrared transceiver 20 is electrically connected to the infrared data communication circuit of the main body 12, thus transmitting or receiving data communication infrared rays.

Figure 2:
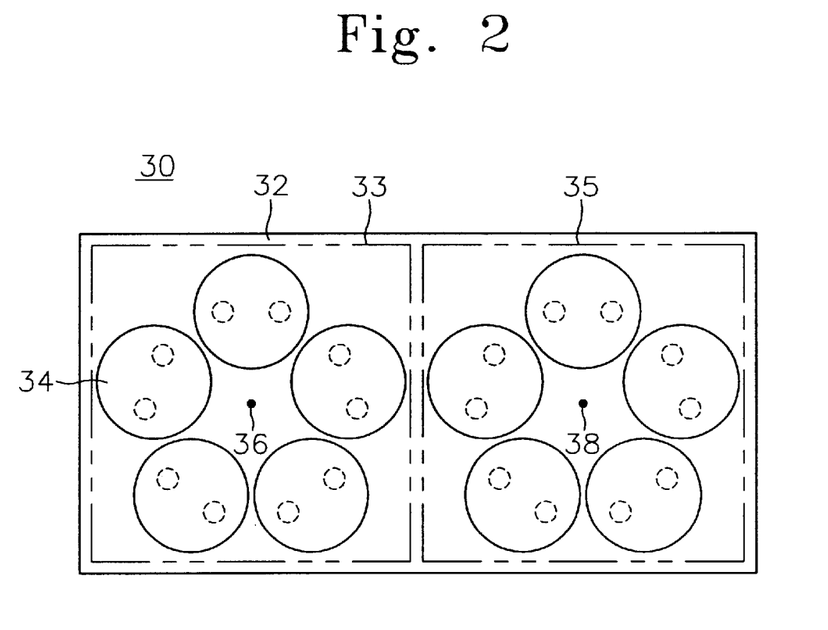
FIG. 2 is a plan view of a circuit board of the portable computer of FIG. 1 with an infrared data sending module being carried on the board, in accordance with the principles of the present invention.

Turn now to FIG. 2, which is a plan view of a circuit board of the portable computer of FIG. 1 with an infrared data sending module being carried on the circuit board, in accordance with the principles of the present invention. As shown in FIG. 2, the infrared data sending module 30 comprises a data sending unit which consists of at least one light element 34 carried on a circuit board 32. The data sending module 30 comprises two light element units: first and second light element units 33 and 35. The first unit 33 consists of five light elements 34, which are regularly and circularly arranged around a first center 36 on the circuit board 32. That is, the light elements 34 of the first unit 33 are arranged in a circle while being spaced out at regular intervals with their mounting points on the board 32 being spaced apart from the center 36 by the same distance. In the same manner, the second unit 35 consists of five light elements 34, which are regularly and circularly arranged around a second center 38 on the circuit board 32. That is, the light elements 34 of the second unit 35 are arranged in a circle while being spaced out at regular intervals with their mounting points on the board 32 being spaced apart from the second center 38 by the same distance.

In FIG. 2, the second center 38 is spaced apart from the first center 36 by a distance. Since the data sending unit comprises at least one light element 34 as described above, it is possible for the data sending unit to enlarge its data sending angle. In the present invention, the light elements 34 are selected from dual in-line pin (DIP) types of light elements.

Figure 3:
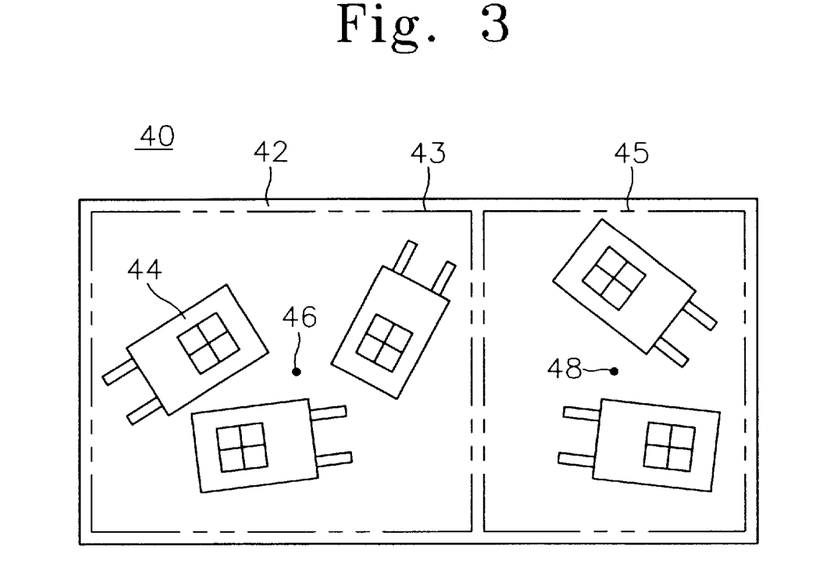
FIG. 3 is a plan view of a circuit board of the portable computer of FIG. 1 with an infrared data receiving module being carried on the board, in accordance with the principles of the present invention.

Turn now to FIG. 3, which is a plan view of a circuit board of the portable computer of FIG. 1 with an infrared data receiving module being carried on the board, in accordance with the principles of the present invention. As shown in FIG. 3, the infrared data receiving module 40 comprises a data receiving unit which consists of at least one light receiving element 44 carried on a circuit board 42. The above data receiving module 40 comprises two light receiving element units: first and second light receiving element units 43 and 45. The first unit 43 consists of three light receiving elements 44, which are arranged around a third center 46 on the circuit board 42 with the mounting points of the elements 44 being spaced apart from the center 46 by the same distance.

In FIG. 3, the second unit 45 consists of two light receiving elements 44, which are arranged around a fourth center 48 on the circuit board 42 with the mounting points of the elements 44 being spaced apart from the fourth center 48 at equal distances. The above fourth center 48 is spaced apart from the third center 46 by a distance. Since the data receiving unit comprises at least one light receiving element 44 as described above, it is possible for the data receiving unit to enlarge its data receiving angle. In the present invention, the light receiving elements 44 are selected from surface mount types of light receiving elements.

Figure 4:
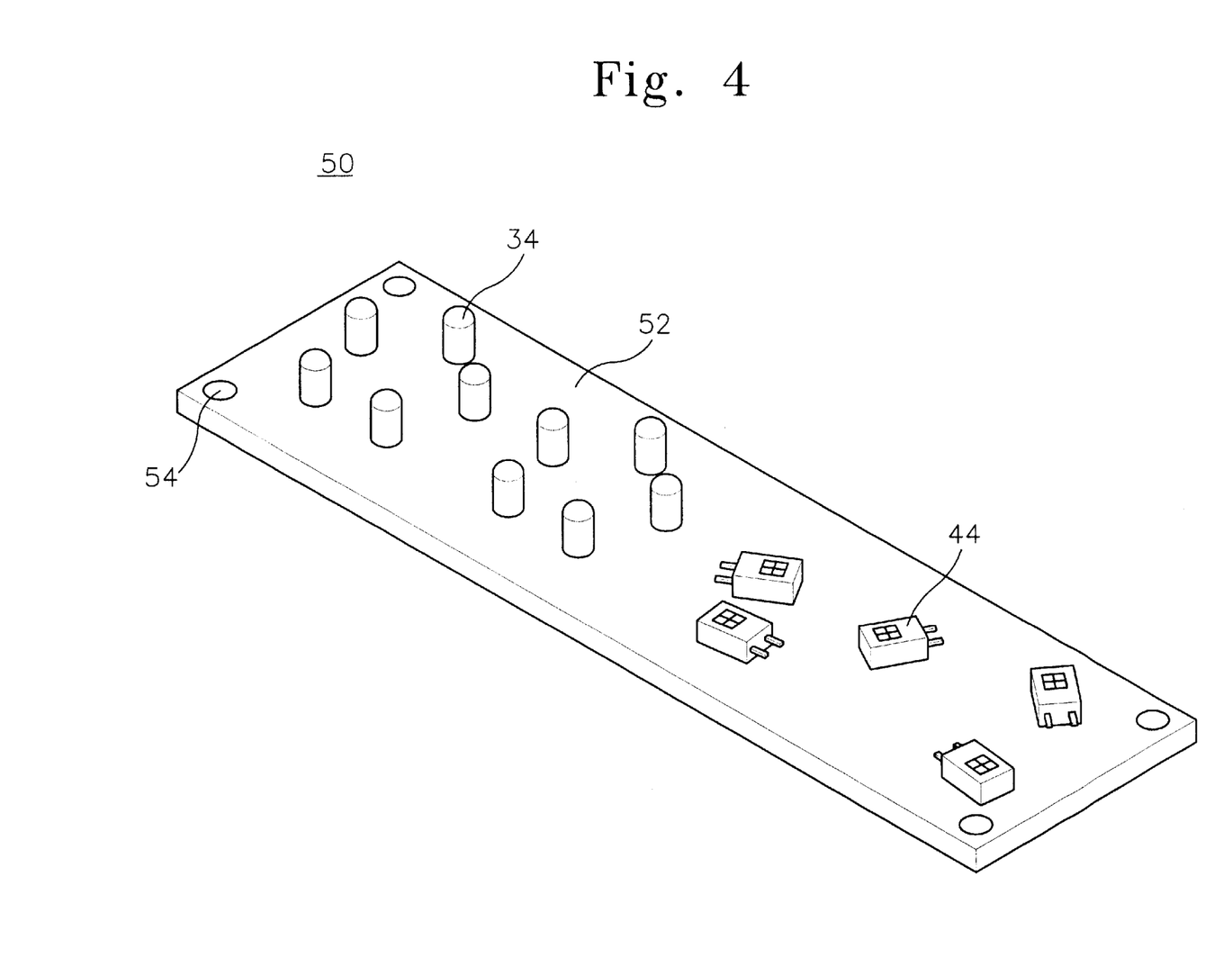
FIG. 4 is a plan view of a circuit board of the portable computer of FIG. 1 with an infrared data sending/receiving module being carried on the board, in accordance with the principles of the present invention.

Turn now to FIG. 4, which is a plan view of a circuit board of the portable computer of FIG. 1 with an infrared data sending/receiving module being carried on the board, in accordance with the principles of the present invention. As shown in FIG. 4, the infrared data sending/receiving module 50 comprises both a data sending unit and a data receiving unit which are commonly carried on one circuit board 52. The data sending unit comprises a plurality of light elements 34 carried on the board 52, while the data receiving unit comprises a plurality of light receiving elements 44.

In the module 50 of FIG. 4, the arrangement of the elements 34 and 44 on the board 52 may be variously designed. That is, the arrangement of the elements 34 and 44 on the board 52 may be designed in that the light elements 34 are arranged on a side portion of the board 52 with the light receiving elements 44 being arranged on the other side portion of the board 52 as shown in FIG. 4. Alternatively, the light elements 34 and the light receiving elements 44 may be mixedly arranged on the board 52. As a further alternative, the light elements 34 and the light receiving elements 44 may be produced as mixed elements each of which selectively emits or receives light. The circuit board 52 has four holes 54.

In a brief description, the modules, used for sending and/or receiving data communication infrared rays according to this invention, may be variously formed as shown in FIGS. 2 through 4. In addition, the data sending and/or receiving modules of this invention individually comprise a plurality of light elements 34 and/or light receiving elements 44.

Figure 5:
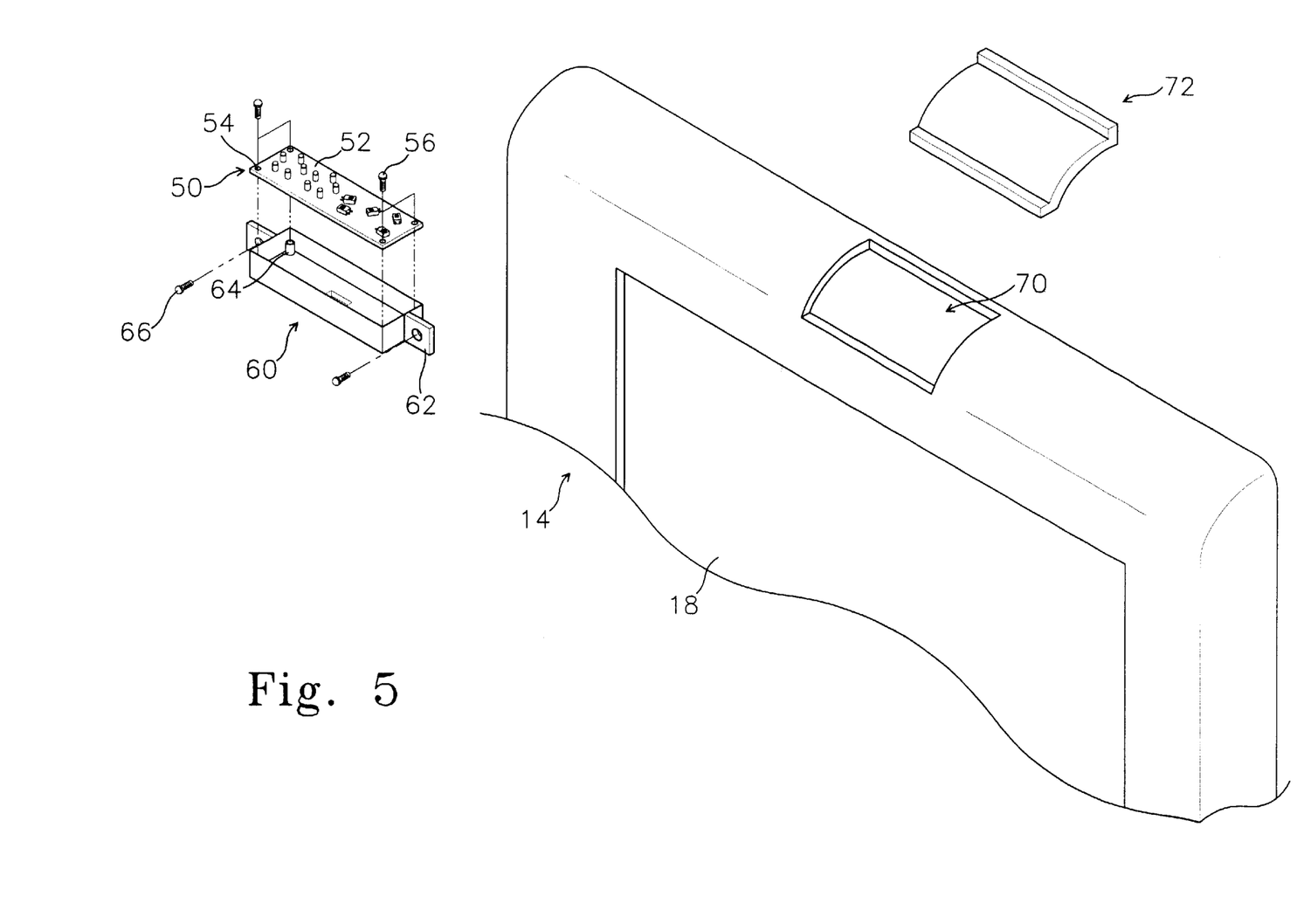
FIG. 5 is an exploded perspective view showing a circuit board, having the infrared data sending/receiving module and being installed on the portable computer of FIG. 1, in accordance with the principles of the present invention.

Turn now to FIG. 5, which is an exploded perspective view showing a circuit board, having an infrared data sending/receiving module and being installed on the portable computer of FIG. 1, in accordance with the principles of the present invention. In addition, refer to FIGS. 1 through 4. As shown in FIG. 1, the portable computer 10 for infrared data communication of this invention comprises two parts: the main body 12 and the display body 14. The main body 12 has a main board, while the display body 14 is hinged to the rear edge of the main body 12 and has a display panel 18. The display panel 18 is opposed to the top surface of the main body 12 when the main body 12 is covered with the display body 14. As shown in FIG. 5, the portable computer 10 has an opening 70 of a predetermined size and configuration formed on the outside edge of the display body 14. An infrared data sending/receiving module 50, shown in FIG. 5, is set in the opening 70 of the display body 14.

The above module 50, electrically connected to the main board of the body 12, comprises a circuit board 52, at least one infrared data sending unit and at least one infrared data receiving unit. The above circuit board 52 is set in the above opening 70 while carrying the data sending and data receiving units. In such a case, the circuit board 52 is set in the opening 70 to be parallel to the outside edge of the display body 14. The infrared data sending unit, comprising at least one light element 34 and used for sending data to the outside, is carried on the board 52 in a way such that the unit is directed toward the opening 70 when the board 52 is set in the opening 70. In the same manner, the infrared data receiving unit, comprising at least one light receiving element 44 and used for receiving data from the outside, is carried on the board 52 in a way such that the unit is directed toward the opening 70 when the board 52 is set in the opening 70.

In FIG. 5, the data sending/receiving module 50 comprises the data sending and data receiving units commonly carried on one circuit board 52. However, it should be understood that the data sending/receiving module 50 maybe variously produced as described above. A transparent window 72 is set on the opening 70, thus protecting the module 50 from the outside.

In FIG. 5, the module 50 may be set in the opening 70 by screwing the circuit board 52 to a bracket inside the opening 70. In such a case, it is preferable to form a plurality of holes 54 for set screws 56 at appropriate positions of the circuit board 52. Alternatively, the above module 50 may be set in the opening 70 of the computer 10 using a separate setting member 60. In such a case, the setting member 60 has a boss 64 at a position corresponding to each screw hole 54 of the circuit board 52, so that the circuit board 52 is stably set in the setting member 60 using the set screws 56. A holed mounting flange 62 is provided at each end of the setting member 60, thus being fixed to a bracket inside the opening 70 using set screws 66. Due to the above setting member 60, it is possible to stably support the circuit board 52 with the module 50 in the opening 70 of the computer 10.

Figure 6:
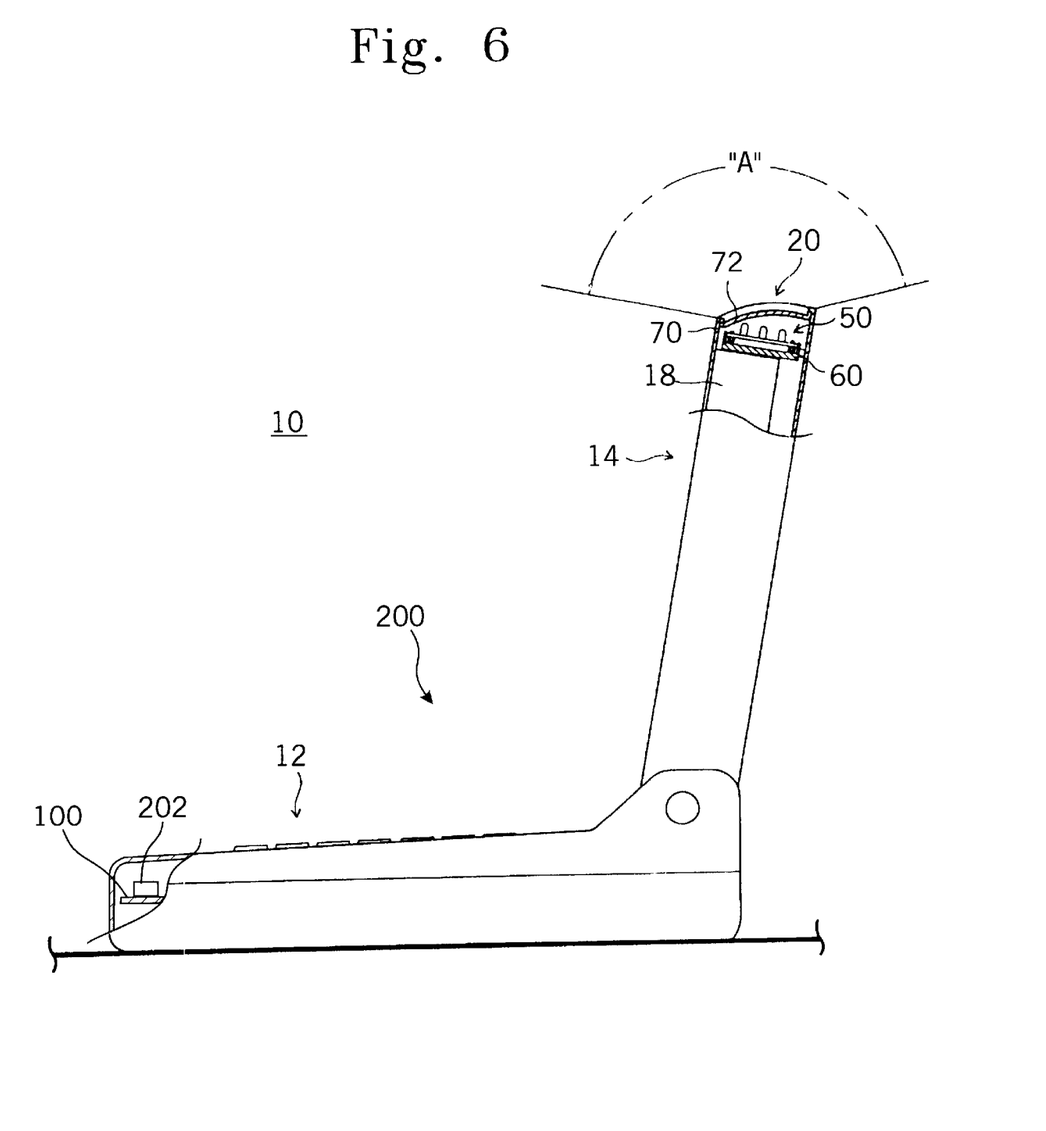
FIG. 6 is a partially broken side view of the portable computer of FIG. 1, showing a portion with an infrared transceiver for data communication, in accordance with the principles of the present invention.

Turn now to FIG. 6, which is a partially broken side view of the portable computer of FIG. 1, showing a portion with an infrared transceiver for data communication, in accordance with the principles of the present invention. FIG. 6 shows a computer 10 having housing 200. As shown in FIG. 6, the infrared transceiver 20 of the portable computer 10 is installed in the opening 70 which is formed on the outside edge of the display body 14. In such a case, the data sending and receiving angle "A" of the transceiver 20 is remarkably enlarged in a way such that the transceiver 20 effectively sends and receives data within an angular range allowed by the edge of the display body 14.

In order to more effectively use such a data sending/receiving module, comprising both at least one light element and at least one light receiving element, the infrared data communication circuit of the portable computer includes a selection circuit 202 capable of selecting one active light receiving element during a data receiving operation of the computer. See FIG. 6. That is, during a data sending operation of the portable computer, the selection circuit activates all light elements to emit infrared rays, thus allowing another electronic appliance to easily and reliably receive the data communication infrared rays from the computer. Meanwhile, during a data receiving operation of the portable computer, the selection circuit selects one active light receiving element to reliably receive the data communication infrared rays from another electronic appliance.

As described above, the present invention provides a portable computer for infrared data communication. The portable computer of this invention has an infrared transceiver capable of enlarging the data sending/receiving angle and reliably performing radio data communication with another electronic appliance. Therefore, the portable computer of this invention effectively performs infrared data communication without being unduly limited by its place, location, arrangement, or orientation. Particularly, the invention allows portable computers for educational applications to be somewhat freely positioned relative to a main computer during infrared data communication. The portable computer of the present invention can communicate with other computers, printers, facsimile machines, scanners, monitors, data input devices such as keyboards, mouse input units, and trackball input units, storage units such as hard disk drives, floppy disk drives, and compact disk-read only memory (CD-ROM) drives, and other types of devices.

In the portable computer of this invention, a selection circuit activates all light elements during a data sending operation of the computer or selects one active light receiving element from a plurality of light receiving elements during a data receiving operation of the computer, thus allowing the computer to perform a reliable infrared data communication.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer apparatus with infrared data communication capabilities, comprising:

a computer device having a housing, an exterior of said housing forming an aperture of a predetermined size on an outer edge of said housing;

a first circuit board being installed in said housing;

a second circuit board being installed in the aperture and being electrically coupled to said first circuit board;

an infrared data sending unit including a plurality of light sending elements positioned adjacent to a first location to form a first grouping of elements, said data sending unit being installed on said second circuit board and being oriented to be directed toward the aperture when said second circuit board is mounted in the aperture;

an infrared data receiving unit including a plurality of light receiving elements positioned outside of and away from said first grouping of elements and positioned adjacent to a second location spaced apart from the first location, said data receiving unit being installed on said second circuit board and being oriented to be directed toward the aperture when said second circuit board is mounted in the aperture;

a window unit being mounted at the aperture and enclosing the aperture, said window unit allowing infrared light to pass through said window unit; and a selection unit selecting one light receiving element from among said plurality of light receiving elements during a data receiving operation of said computer apparatus, said one selected light receiving unit receiving the data, and said selection unit activating all of said light sending elements during a data sending operation of said computer apparatus, all of said activated light sending elements sending the data;

said infrared data sending unit further comprising:
- a first light sending element unit including a first set of light sending elements, said first set of light sending elements being regularly arranged around a first center on said second circuit board to be spaced out at regular intervals with mounting points on said second circuit board being spaced apart from said first center at equal distances, said first set of light sending elements being among said plurality of light sending elements; and
- a second light sending element unit including a second set of light sending elements, said second set of light sending elements being regularly arranged around a second center on said second circuit board to be spaced out at regular intervals with mounting points on said second circuit board being spaced apart from said second center at equal distances, said second center being spaced apart from said first center, and said second set of light sending elements being among said plurality of light sending elements.

2. The apparatus of claim 1, wherein said infrared data receiving unit further comprises:
- a first light receiving element unit including a first set of light receiving elements, said first set of light receiving elements being arranged around a third center on said second circuit board with mounting points on said second circuit board being spaced apart from said third center at equal distances, said first set of light receiving elements being among said plurality of light receiving elements; and
- a second light receiving element unit including a second set of light receiving elements, said second set of light receiving elements being arranged around a fourth center on said second circuit board with mounting points on said second circuit board being spaced apart from said fourth center at equal distances, said fourth center being spaced apart from said third center by a distance, and said second set of light receiving elements being among said plurality of light receiving elements.

3. The apparatus of claim 2, said first set of light sending elements corresponding to at least four light sending elements, said second set of light sending elements corresponding to at least four light sending elements, said first set of light receiving elements corresponding to at least two light receiving elements, and said second set of light receiving elements corresponding to at least one light receiving element.

4. The apparatus of claim 1, wherein said second circuit board is installed in the aperture to be parallel to said outside edge of said housing.

5. The apparatus of claim 1, wherein said infrared data sending unit and said infrared data receiving unit are included in one multipurpose unit.

6. The apparatus of claim 1, wherein said plurality of light sending elements are selected from dual in-line pin types of light sending elements.

7. The apparatus of claim 1, wherein said plurality of light receiving elements are selected from surface mount types of light receiving elements.

8. A computer apparatus with infrared data communication capabilities, comprising:
- a computer device having a housing, an exterior of said housing forming an aperture of a predetermined size on an outer edge of said housing;
- a first circuit board being installed in said housing;
- a second circuit board being installed in the aperture and being electrically coupled to said first circuit board;
- an infrared data sending unit including a plurality of light sending elements positioned adjacent to a first location to form a first grouping of elements, said data sending unit being installed on said second circuit board and being oriented to be directed toward the aperture when said second circuit board is mounted in the aperture;
- an infrared data receiving unit including a plurality of light receiving elements positioned outside of and away from said first grouping of elements and positioned adjacent to a second location spaced apart from the first location, said data receiving unit being installed on said second circuit board and being oriented to be directed toward the aperture when said second circuit board is mounted in the aperture;
- a window unit being mounted at the aperture and enclosing the aperture, said window unit allowing infrared light to pass through said window unit; and
- a selection unit selecting one light receiving element from among said plurality of light receiving elements during a data receiving operation of said computer apparatus, said one selected light receiving unit receiving the data, and said selection unit activating all of said light sending elements during a data sending operation of said computer apparatus, all of said activated light sending elements sending the data;

said infrared data receiving unit further comprising:
- a first light receiving element unit including a first set of light receiving elements, said first set of light receiving elements being arranged around a third center on said second circuit board with mounting points on said second circuit board being spaced apart from said third center at equal distances, said first set of light receiving elements being among said plurality of light receiving elements; and
- a second light receiving element unit including a second set of light receiving elements, said second set of light receiving elements being arranged around a fourth center on said second circuit board with mounting points on said second circuit board being spaced apart from said fourth center at equal distances, said fourth center being spaced apart from said third center by a distance, and said second set of light receiving elements being among said plurality of light receiving elements.

9. The apparatus of claim 8, wherein said second circuit board is installed in the aperture to be parallel to said outside edge of said video display.

10. The apparatus of claim 8, wherein said plurality of light sending elements are selected from dual in-line pin types of light sending elements.

11. The apparatus of claim 8, wherein said plurality of light receiving elements are selected from surface mount types of light receiving elements.

12. The apparatus of claim 8, wherein said infrared data sending unit and said infrared data receiving unit are included in one multipurpose unit.

* * * * *